Patented Apr. 18, 1950

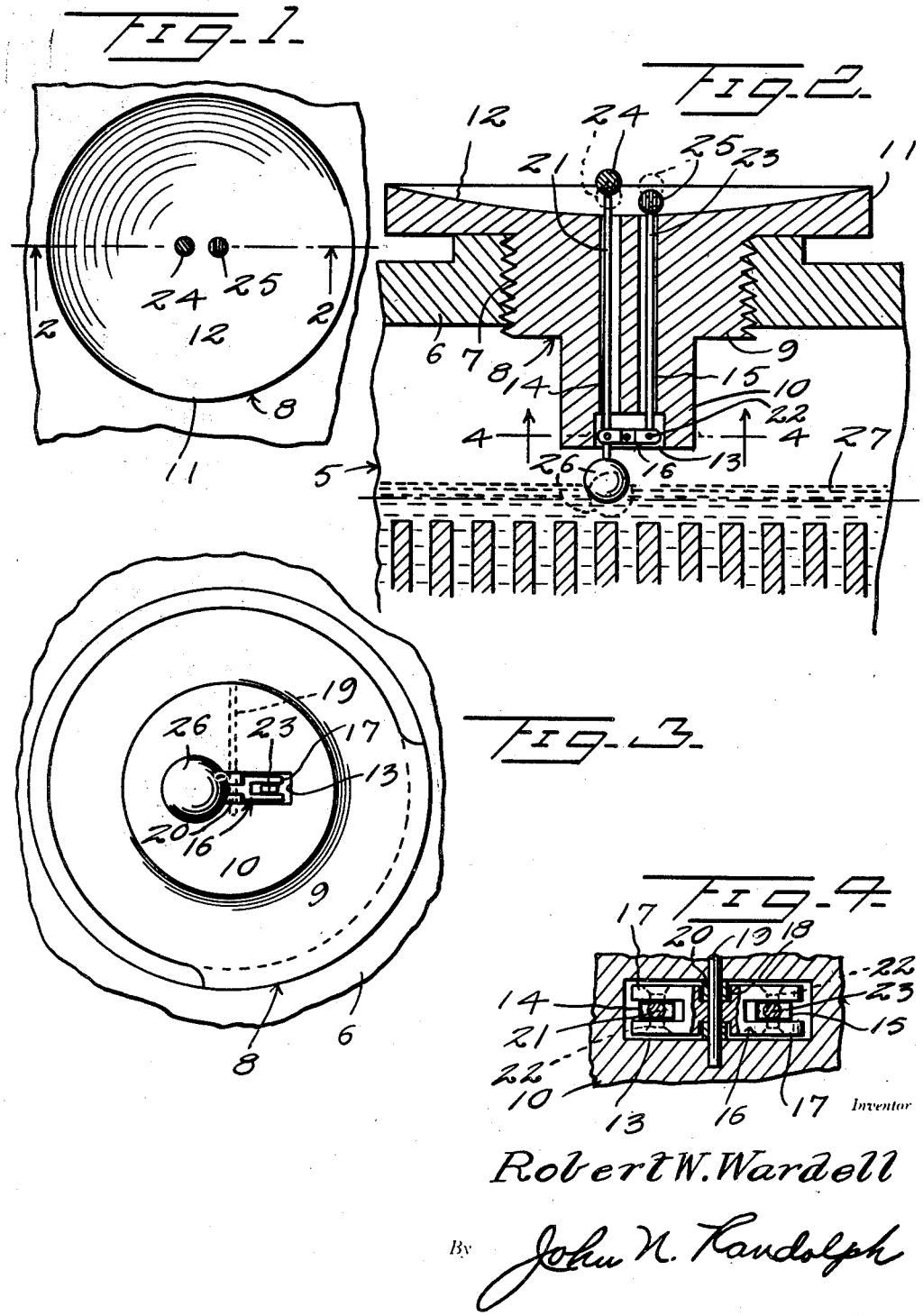

2,504,288

UNITED STATES PATENT OFFICE 2,504,288

LIQUID LEVEL INDICATOR FOR STORAGE BATTERIES

Robert W. Wardell, Sullivan, Ind.

Application October 15, 1948, Serial No. 54,686

4 Claims. (Cl. 136—182)

This invention relates to an attachment adapted to be mounted on and carried by the closures or plugs which normally close the filling openings in the top wall of a storage battery to provide a visual indicator for indicating when the water level of the cells of a battery is low and needs replenishing.

Most modern motor vehicles have their storage batteries positioned beneath the hood and it is accordingly a primary purpose of the present invention to provide a visual indicator for storage batteries which will be visible when the hood is raised for the purpose of refilling the radiator or crank case to indicate visually whether or not the cells of the storage battery require refilling thereby saving loss of time in unnecessarily removing the plugs from a storage battery to check the water level when refilling is not necessary.

Another object of the invention is to provide a visual indicator by means of which the condition of the water in the cells of a storage battery may be more accurately checked than by looking into batteries through the filling openings.

A further object of the invention is to provide a specially constructed plug for use with the attachment and which will enable its use with batteries disposed beneath the seat or floor board.

Various other objects and advantages of the invention will hereinafter become more fully apparent from the following description of the drawing, illustrating a preferred embodiment thereof, and wherein:

Figure 1 is a top plan view of a portion of a storage battery showing a battery plug equipped with the indicator attachment;

Figure 2 is an enlarged vertical sectional view taken substantially along a plane as indicated by the line 2—2 of Figure 1;

Figure 3 is an enlarged bottom plan view thereof, and

Figure 4 is a horizontal sectional view, on an enlarged scale, taken substantially along a plane as indicated by the line 4—4 of Figure 2.

Referring more specifically to the drawing, the numeral 5 designates generally a portion of one cell of a conventional storage battery and the numeral 6 the top wall of the storage battery having threaded flanged openings communicating with the cells thereof, one of which is shown at 7. The filling opening 7 is normally closed by a plug, designated generally 8 which is removable for refilling the battery cell with water.

The plug 8 constituting a part of the invention includes an intermediate threaded shank portion 9 which engages in the threaded opening 7, a restricted depending stem 10 and an enlarged flanged head 11 which is adapted to be engaged between the fingers for applying or removing the plug 8. The head 11 has an upper dished or concave surface 12, for a purpose which will hereinafter be described and said plug 8 differs from the conventional battery plug in being provided with the concave surface 12 and the depending stem 10.

The stem 10 is provided at its lower end with a transversely extending recess 13 which opens outwardly of the outer or lower end of said stem and the stem and shank portion 9 are provided with spaced bores 14 and 15 the upper ends of which open into the concave surface 12 and the lower ends of which open into the recess 13.

A lever, designated generally 16, is disposed longitudinally in the recess 13 and as best illustrated in Figure 4 comprises corresponding fork-shaped or bifurcated ends 17 and an intermediate shank portion 18 having an opening therethrough for receiving a pivot pin 19 which extends transversely through the recess 13 and which is anchored in the stem 10 for pivotally mounting the lever 16 for vertical swinging movement or in a direction generally longitudinally of the plug 8. The lever 16 is held against lateral displacement in the recess 13 by spacing sleeves 20 carried by the pin 19. A rod 21 has a portion adjacent its lower end extending through one of the forked-shaped ends 17 and pivotally connected thereto by a pivot pin 22 and the lower end of another rod 23 is mounted in and pivotally connected to the other forked-shaped lever end 17 by a second pivot pin 22. The rods 21 and 23 extend upwardly through the bores 14 and 15, respectively, and are provided at their upper ends with indicator heads 24 and 25, respectively, which are disposed in the concave surface 12. The indicator elements or heads 24 and 25 may be of any desired shape preferably spherical and the head 24 is preferably colored green while the head 25 is preferably red. The rod 21 has a lower end which extends downwardly from the lever 16 to below the lower end of the stem 10 and to the terminal of which is connected a float 26 which is supported in the solution of the battery cell 5 the liquid level of which is indicated at 27 in Figure 2. The parts 16, 19, 20, 21, 22, 23 and 26 are formed of a light weight material which is rust and corrosion resistant such as copper, brass or plastic.

In Figure 2 the level of the solution 27 is shown at a proper height to cover adequately the battery plates and the float 26 is accordingly supported thereby in its elevated position as seen in full lines so that the rod 21 and its green indicator head 24 is elevated whereas the rod 23 and its red indicator head 25 is in a lowered position for indicating that the battery cell 5 does not require refilling and it will be obvious that this fact will be indicated visually by the indicator head 24 without removing the plug 8. As the level of the solution 27 drops and considerably before it falls to the level of the upper edges of the battery plates, the float 26 will assume its dotted line position of Figure 2 thereby urging the rod 21 and indicator 24 downwardly to their dotted line positions of Figure 2 and rocking the lever 16 counter-clockwise to its dotted line position for elevating the rod 23 and indicator head 25 to the dotted line position of Figure 2. When the red indicator 25 is thus elevated it will visually indicate without removal of the plug 8 that the battery cell 5 requires refilling and it will be readily apparent that after refilling, when the plug 8 is reapplied the float 26 will be caused to resume its position as seen in full lines in Figure 2. The bores 14 and 15 are of sufficient size to accommodate the lateral movement of the rods 21 and 23 resulting from the rocking movement of the lever 16 and the unoccupied portions of said bores will afford air vents through the plug to the cell 5.

The concave surface 12 substantially accommodates the indicators 24 and 25 so that a battery equipped with said attachment can readily be mounted beneath a seat or floor board of a vehicle or elsewhere where only a very limited space is provided above the battery.

Various modifications and changes are contemplated and may obviously be resorted to, without departing from the spirit or scope of the invention as hereinafter defined by the appended claims.

I claim as my invention:

1. A visual liquid level indicator for storage battery cells comprising a float, means for reciprocally supporting the float beneath a removable battery plug for movement toward and away from the plug in response to variations in the liquid level of a storage battery cell, and distinctively marked indicator elements connected to the float by said means and disposed above the plug for movement toward and away from the plug in response to movement of the float for indicating when the liquid in the battery cell requires replenishing, said means comprising rods extending longitudinally through the battery plug and disposed for reciprocating movement therein, said indicator elements being connected to the upper ends of the rods and being disposed above an upper surface of the plug, and a lever pivotally mounted on the plug intermediate of its ends and pivotally connected at its ends to said rods and at one of its ends to said float.

2. A visual liquid level indicator for storage battery cells comprising a battery plug for removably closing a filling opening of a storage battery cell, a lever pivotally mounted in the plug for swinging movement in a direction longitudinally of the plug, a pair of rods extending longitudinally through said plug and pivotally connected to the lever on opposite sides of its pivot, said rods being disposed for reciprocating movement in the plug, one of said rods having a portion depending below said lever, and a float secured to said depending rod portion and adapted to be supported in the liquid of the storage battery cell for movement toward and away from the plug in response to variations in the liquid level for raising and lowering said rods for indicating when the battery cell requires refilling.

3. A visual indicator for storage batteries as in claim 2, said rods having distinctively colored indicator elements on their upper ends disposed in a position visible from above the battery.

4. A visual indicator for storage batteries as in claim 2, said rods having distinctively colored indicator elements on their upper ends disposed in a position visible from above the battery, said plug having a concave upper surface for accommodating said visual indicating elements.

ROBERT W. WARDELL.

REFERENCES CITED

The following references are of record in the file of this patent:

UNITED STATES PATENTS

| Number | Name | Date |
|---|---|---|
| 1,456,743 | Szabo | May 29, 1923 |
| 2,074,260 | Gerow | Mar. 16, 1937 |
| 2,316,377 | Wilhelm | Apr. 13, 1943 |